Oct. 6, 1953      E. D. HOESCH ET AL      2,654,143
METHOD OF MAKING WELDED BLADE STRUCTURES
Filed Aug. 24, 1949
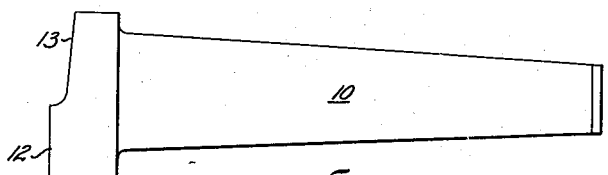
Fig. 1
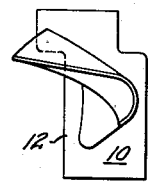
Fig. 2
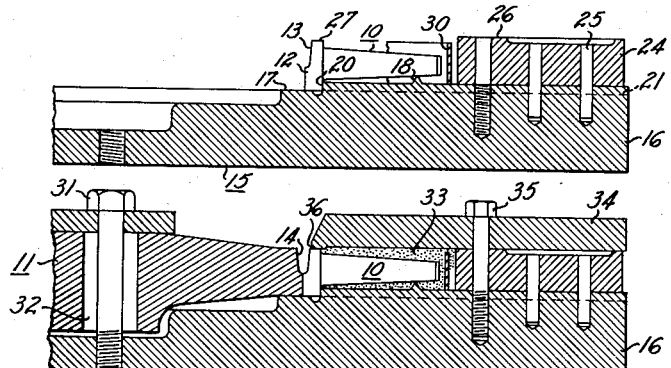
Fig. 3
Fig. 4
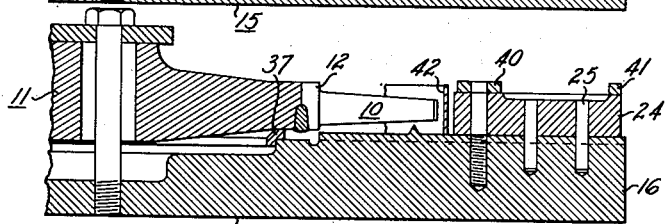
Fig. 5
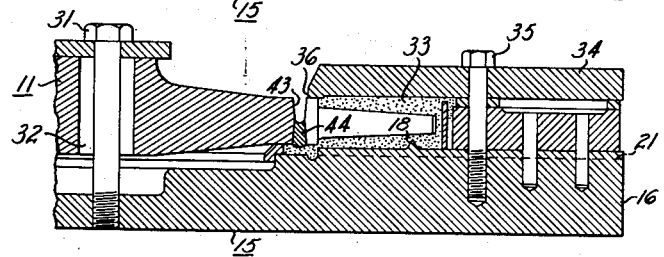
Fig. 6
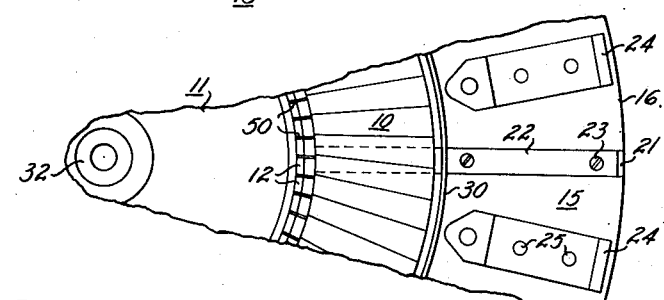
Fig. 7
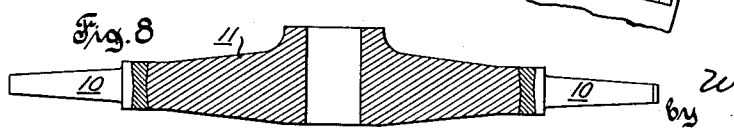
Fig. 8
Inventors
Elmer D. Hoesch
Robert G. Matters
Wayne G. Easton
by
Attorneys Patented Oct. 6, 1953

2,654,143

UNITED STATES PATENT OFFICE 2,654,143

METHOD OF MAKING WELDED BLADE STRUCTURES

Elmer D. Hoesch, West Allis, and Robert G. Matters, Milwaukee, Wis., assignors to Allis-Chalmers Manufacturing Company, Milwaukee, Wis., a corporation of Delaware Application August 24, 1949, Serial No. 112,042

4 Claims. (Cl. 29—156.8)

This invention relates generally to assemblies embodying cast or weld metal joints and more partciularly to the methods and means for securing blades to a turbine disk or the like. The principal object of the invention is to provide new and improved methods and means for the attachment of metal elements by welding to provide an integral article.

In a broad aspect the invention resides in the art of attaching elements by a welded joint and is specifically directed to methods and means for preventing relative movement of the elements during the welding operation, and to methods and means for arranging the elements prior to the welding operation to prevent high stresses and to lessen the tendency of cracking in the weld after the weld metal cools.

Another object of this invention is to provide new and improved methods and means for preventing relative movement, during the welding operation, between elements which are to be attached by welding to form an integral article.

Another object is to provide new and improved methods and means for preventing relative movement, during the welding operation, between elements which are to be attached by welding to form an integral article in instances where it is impracticable to apply mechanical clamping means to said elements.

Another object is to provide new and improved methods and means for preventing relative movement, during the welding operation, between elements which are to be attached by welding to form an integral article in such a manner that the clamping pressure may be evenly distributed over substantially the entire element desired restrained.

Another object is to provide new and improved methods and means for preventing relative movement, during the welding operation, between a disk and blades which are to be attached thereto by welding.

Another object is to provide new and improved methods and means for preventing relative movement, during the welding operation, between a disk and blades which are to be attached thereto by welding in instances where it is impracticable to apply conventional mechanical clamping means to said blades.

Another object is to provide new and improved methods and means for preventing relative movement, during the welding operation, between a disk and blades which are to be attached thereto by welding such that the clamping pressure may be evenly distributed over substantially the entire surface of each blade.

Another object is to provide a method of welding which reduces the tendency of a crack to extend into a weld between members whose adjacent surfaces form such crack.

Another object is to provide a method of welding which prevents excessive internal stresses from occurring where the joint between adjacent elements terminates in a weld which connects these elements to a support member.

Another object is to provide in connection with the attachment of blades to a disk by welding a method which reduces the tendency of radial interblade extensions from extending into a weld between adjacent blade bases.

Another object is to provide in connection with the attachment of blades to a disk a method which prevents high internal stresses from occurring where the joint between adjacent blade bases terminates in a weld which secures the blade bases to the disk rim.

Other objects will appear hereinafter as the description of the invention proceeds.

The novel features of the invention and how the objects are attained will appear more fully from this specification and the accompanying drawings showing one embodiment of the invention and forming a part of this application, and all these novel features are intended to be pointed out in the claims.

In the drawing:

Fig. 1 is a side elevation of a blade which is susceptible of being attached to a disk by the employment of the invention;

Fig. 2 is an end elevation of the blade shown in Fig. 1;

Fig. 3 is a section showing the blades placed in a fixture which may be used in the manufacture of a bladed rotor in accordance with the disclosed method;

Fig. 4 is a section similar to Fig. 3 showing the disk and blades in clamped position ready for welding the first side;

Fig. 5 is a section similar to Fig. 3 except that the disk and blades are inverted in preparation for welding of the second side;

Fig. 6 is a section similar to Fig. 4 except that the disk and blades are clamped in an inverted position in praparation for welding the second side;

Fig. 7 is a plan view of the disk, blading, and fixture showing a keyway for inserting the last blade and spacers between the blade bases; and Fig. 8 is the completed disk and blade assembly.

Referring to the drawing for an example of one of the many arrangements which may be welded in accordance with this invention, Figs. 1 and 2 show an element or blade 10, a plurality of which is to be attached by welding to a support member or disk 11, as shown in Fig. 8. In this instance a blade base 12 has a weld preparation contour 13 which is complementary to a weld preparation contour 14 (see Fig. 4) on the rim of the disk 11; it is to be understood, however, that any suitable method of preparing the surfaces of the respective elements for attachment by welding may be utilized.

In Figs. 3, 4, 5, 6 and 7 is illustrated a fixture 15 which may be used in manufacturing a bladed rotor in accordance with this invention. The fixture 15 comprises a base member 16 of suitable diameter having annular locating surfaces for positioning the blades 10 and the disk 11; the locations of these surfaces being determined in each case by the size and shape of the elements to be positioned in the fixture. Fig. 3 shows the blades 10 stacked in the fixture 15, in preparation for welding the first side, with the blades being axially located by a surface 17 and an annular rib 18 and radially located by an annular vertical surface 20.

The blades 10, in this instance, have blade bases 12 of the offset type as shown in Fig. 2. A keyway 21 (Fig. 7) is provided in the base member 16 and the last blade in the row is placed in position through the keyway. A key 22, having its top surface flush with the top surface of the base member 16, is provided and said last blade is driven tightly into position causing the complete blade ring to tighten against surface 20. The key 22 is then secured in the keyway 21 by means of cap screws 23.

A plurality of spacer blocks 24 are secured to the base member 16 by means of dowels 25 and are located radially outward from the blades 10 and in circumferentially spaced relation. In such position the plane 26 of the upper surfaces of the blocks 24 is slightly higher than the plane of the upper surfaces 27 of the blade bases 12. Fluid retaining means, herein shown as a thin steel annular dam 30, is placed completely around the blades 10 in the space between the tips of the blades and the spacer blocks 24. The height of the dam 30 is slightly less than the height of the blocks 24.

As shown in Fig. 4, the disk 11 is axially located on the annular surface 17 of the base member 16 and secured thereto by means of a bolt 31, which extends through a hole 32 in the disk and is threaded into the base member, thereby positioning the disk in welding relation to the blades 10.

The region surrounding the blades 10 between the blade bases 12 and the dam 30 is filled so as to overflow with a flowable solidifiable material 33, in this instance characterized by a slurry (consistency of thick cream) of gypsum cement with a setting expansion rate of .0005" per inch, a setting time of sixteen minutes, and a compressive strength of 4500 p. s. i. when dry. The annular rib 18, upon which the blade 10 is axially located, permits the material 33 to flow beneath the blades such that the blades are substantially surrounded on all sides by such material. Prior to the solidification of material 33 an annular cover member 34 is secured to the spacer blocks 24, by means of bolts 35 which are threaded into the base member 16, such that a portion of the underside of the cover engages the surface of the material 33. It is important that the cover member 34 be in fixed relation to the base member 16 but does not necessarily have to be attached as shown. It is to be noted that in this instance a lip 36 on the inside diameter of the cover 34 bears on the upper surfaces 27 of the blade bases 12 causing a turning moment on the blades 10 forcing them against the rib 18. It is to be understood, however, that the cover member 34 with the lip 36 or other equivalent mechanical means for clamping the blades 10 to the base member 15 may be omitted in which case material 33 alone would be relied on to perform the clamping function.

After the cover member 34 is in place and the material 33 has been allowed to set, the fixture is preheated to a specified temperature for welding and the first side is then welded in any known manner. The fixture is allowed to cool and the material 33 is subsequently chipped from the blades 10.

Preparation for welding of the opposite side is made in accordance with Figs. 5 and 6 but it is to be understood that in some cases it may be satisfactory to weld only on one side and it is obvious that this invention is applicable to such constructions also. In the present instance the same base member 16 may be used for welding the opposite side and as the blades 10 are now attached, the disk 11 with the attached blades is inverted and placed in the fixture 15 as shown in Fig. 5. A base ring 37, positioned concentrically on the surface 17 of the base member 16, is provided to axially locate the disk 11 and the disk is attached concentrically to the base member by means of the bolt 31 which extends through the hole 32 in the disk and is threaded into the base member. The addition of the base ring 37 makes it necessary to add an equivalent height to the spacer blocks 24 and this is done by means of spacer washers 40 and 41. A thin steel dam 42 is placed on the fixture 15 as before, but this time the height thereof is to be slightly less than the height of the spacer blocks 24 and the added spacer washers 40 and 41. A slurry of the material 33 is again prepared and the region between the blade bases 12 and the dam 42 is filled to overflowing as before. The cover member 34 is secured in place as before except that the spacer washers 40 and 41 now separate the cover member from the spacer blocks 24. As in preparing the first side for welding, the lip 36 or another equivalent mechanical means for clamping the blades 10 to the base member 15 may be omitted. After the material 33 has been allowed to set a second annular weld preparation contour 43 is machined between the rim of the disk 11 and the blade bases 12 on the side opposite the first weld 44, as shown in Fig. 6. The fixture 15 is then preheated to a specified temperature for welding and the second side is then welded in any known manner. The fixture is allowed to cool and the material 33 is subsequently chipped from the blades 10.

Another feature of the invention is to provide means for preventing excessive internal stresses from occurring where the joint between adjacent elements terminates in a weld which connects these elements to a support member and also to reduce the tendency of the space between these elements from extending into the weld during cooling thereof, after the welding operation. In the attachment of metal elements by welding to provide an integral article, wherein a plurality of elements having adjacent sides abutting each other and which are to be joined at their ends to a support member, there is a fundamental problem wherein an excessive strain is imposed on the cooling weld by the contraction of the elements which often causes the weld metal to crack. The invention provides a solution to this problem and although such solution will be illustrated (see Fig. 7) in connection with the attaching of blades to a disk it is to be understood that it also has a more general application in the attachment of various other types of elements by welding.

Knowing the dimensions of the blade bases 12, the coefficient of linear expansion of the kind of metal of which the blades are composed, and the welding temperature, it is possible to calculate the actual linear expansion in a circumferential direction of each blade base as the temperature increases from room temperature to welding temperature. The width of the blade bases 12 is selected and the blades are so stacked around the rim of the disk 11 such that a space is provided between each of the blade bases somewhat greater than the above mentioned actual linear expansion of each of the blade bases. The means for providing a space between each of the blade bases 12 is herein characterized by spacers 50 composed of a material which permits spacing of the blade bases upon stacking in the fixture 15 but which readily compresses to permit expansion of the blade bases in a circumferential direction. The effect of such spacing is that expansion of the blade bases 12 does not entirely close the space between them and thus permits the weld metal to bridge this residual gap between the blade bases. It is clear that where such a residual gap is not provided for, a radial crack must develop and progress into the weld, upon contraction of blade bases 12, until the elastic deformations and local yielding reduce the stress to an acceptable limit. However, where a residual gap exists after expansion of the blade bases 12 it is seen that the length of weld metal across such gap will be circumferentially extended upon contraction of the blade bases but it is obvious that the internal strain and tendency to crack is much less than the case where the blade bases are close fitted and no weld metal exists between the blade bases prior to contraction of the blade bases. To illustrate further, with an example, assume that the width of each blade base 12 expands 0.002″ and that a 0.010″ spacer 50 is provided upon stacking between each of the blade bases. The assumed 0.002″ expansion leaves residual a gap of 0.008″ between the blade bases 12 and the weld metal bridges this gap. When the blade bases 12 cool the contraction requires 0.002″ extension of the 0.008″ length of the weld across the separation. This requirement of 25% extension in a circumferential direction results in less internal strain in the weld and less tendency to crack the weld than in the case of the close fitted blades where only a negligible amount of weld metal between the blade bases is subjected to this circumferential extension upon contraction of the blade bases.

Various means may be used for spacing the blade bases 12 such as inserting spacers 50 having the proper thickness between the blade bases. An electrical insulation fiber, often called fish paper, which is made in various degrees of thickness and has a paper-like substance is one example of a type of spacer which gives satisfactory results.

A bladed rotor fabricated by inserting spacers 50 of the proper size between the blade bases upon stacking, as described above, may be distinguished from a bladed rotor where the blade bases are originally close fitted. This distinction may be seen in the finished rotor by calculating the contraction of the width of a blade base from welding temperature to room temperature and noting, by physical measurement, that the widths of the spaces between the blade bases are respectively greater than the calculated contraction of the blade bases. In the case of close fitted blade bases the spaces therebetween will be respectively equal to the calculated contraction. Thus, in this respect, a bladed rotor fabricated according to my method differs physically from a bladed rotor which does not provide such spacing means between the blade bases upon stacking.

From the foregoing it will be apparent to those skilled in the art that the illustrated embodiment of the invention provides a new and novel method for the attachment of metal elements by welding to provide an integral article, and accordingly, accomplishes the objects of the invention. On the other hand, it will also be obvious to those skilled in the art that the illustrated embodiment of the invention may be variously changed and modified, or features thereof, singly or collectively, embodied in other combinations than those illustrated without departing from the spirit of the invention and accordingly the disclosure herein is illustrative only, and the invention is not limited thereto.

It is claimed and desired to secure by Letters Patent:

1. The method of making a bladed element for turbines and the like comprising the steps of placing a circumferential row of blades around a rotor disk with the base portions of said blades and the rim portion of said disk cooperating to define an annular weld receivable contour, providing liquid retaining means in cooperable relation to said blades to enclose an area to receive and retain a slurry in engagement with said blades except in a zone about said weld receivable contour, applying a slurry of solidifiable material in said enclosed area cooperable with said blades upon solidification of said material to seize and hold said blades in position pending the application and freezing of weld metal to said weld preparation contour, applying weld metal to said weld receivable contour after said material solidifies, and then removing said material after said weld metal freezes.

2. The method of making a bladed element for turbines and the like comprising the steps of placing a circumferential row of blades around a rotor disk with the base portions of said blades and the rim portion of said disk cooperating to define an annular weld receivable contour, providing liquid retaining means in cooperable relation to said blades to enclose an area to receive and retain a slurry in engagement with said blades except in a zone about said weld receivable contour, applying a slurry of gypsum cement in said enclosed area cooperable with said blades upon solidification of said cement to seize and hold said blades in position pending the application and freezing of weld metal to said weld preparation contour, applying weld metal to said weld receivable contour after said cement solidifies, and then removing said cement after said weld metal freezes.

3. The method of welding blades to a rotor disk for turbines and the like comprising the steps of placing on a base member a rotor disk and a circumferential row of blades around said rotor disk with the base portions of said blades and the rim portion of said disk cooperating to define an annular weld receivable contour, providing liquid retaining means in cooperable relation to said blades to enclose an area to receive and retain a slurry in engagement with said blades except in a zone about said weld receivable contour, applying a slurry of solidifiable material in said enclosed area cooperable with said blades upon solidification of said material to seize and hold said blades in position pending the application and freezing of weld metal to said weld preparation contour, applying prior to the solidification of said material a cover member such that a portion of the under side of said cover member engages the surface of said material and another portion of the under side of said cover member bears on at least a portion of said blades to cooperate with said material to hold said blades rigidly in position, applying weld metal to said weld receivable contour after said material solidifies, and then removing said cover member and said material after said weld metal freezes.

4. The method of welding blades to a rotor disk for turbines and the like comprising the steps of placing on a base member a rotor disk and a circumferential row of blades around said rotor disk with the base portions of said blades and the rim portion of said disc cooperating to define an annular weld receivable contour, providing liquid retaining means in cooperable relation to said blades to enclose an area to receive and retain a slurry in engagement with said blades except in a zone about said weld receivable contour, applying a slurry of gypsum cement in said enclosed area cooperable with said blades upon solidification of said cement to seize and hold said blades in position pending the application and freezing of weld metal to said weld preparation contour, applying prior to solidification of said cement a cover member such that a portion of the under side of said cover member engages the surface of said cement and another portion of the under side of said cover member bears on at least a portion of said blades to cooperate with said cement to hold said blades rigidly in position, applying weld metal to said weld receivable contour after said cement solidifies, and then removing said cover member and said cement after said weld metal freezes.

ELMER D. HOESCH.
ROBERT G. MATTERS.

References Cited in the file of this patent

UNITED STATES PATENTS

| Number | Name | Date |
| --- | --- | --- |
| 901,960 | Farquhar | Oct. 27, 1908 |
| 1,510,146 | Johnson | Sept. 30, 1924 |
| 1,551,342 | Steenstrup | Aug. 25, 1925 |
| 2,090,468 | Brown | Aug. 17, 1937 |
| 2,201,037 | Hagenmeyer | May 10, 1940 |
| 2,380,276 | Warren | July 10, 1945 |
| 2,384,919 | Huber | Sept. 18, 1945 |
| 2,392,281 | Allen | Jan. 1, 1946 |
| 2,405,146 | Huber | Aug. 6, 1946 |
| 2,450,493 | Strub | Oct. 5, 1948 |
| 2,454,580 | Thielemann | Nov. 23, 1948 |
| 2,504,823 | George | Apr. 18, 1950 |

FOREIGN PATENTS

| Number | Country | Date |
| --- | --- | --- |
| 9,721 | Great Britain | May 5, 1908 |